United States Patent [19]

Lipkie et al.

[11] Patent Number: 4,759,075

[45] Date of Patent: Jul. 19, 1988

[54] METHOD AND APPARATUS FOR VECTORIZING DOCUMENTS AND SYMBOL RECOGNITION

[75] Inventors: Curtis A. Lipkie, Littleton; Eugene A. Kleca, Broomfield, both of Colo.

[73] Assignee: ANA Tech Corporation, Littleton, Colo.

[21] Appl. No.: 850,232

[22] Filed: Apr. 10, 1986

Related U.S. Application Data

[62] Division of Ser. No. 475,037, Mar. 14, 1983.

[51] Int. Cl.⁴ .............................................. G06K 9/62
[52] U.S. Cl. ......................................... 382/46; 382/34
[58] Field of Search .................. 382/13, 41, 44, 46, 382/34

[56] References Cited

U.S. PATENT DOCUMENTS

| | | | |
|---|---|---|---|
| 4,284,975 | 8/1981 | Odaka | 382/13 |
| 4,435,837 | 3/1984 | Abernathy | 382/41 |
| 4,440,513 | 4/1984 | Kataoka et al. | 382/13 |
| 4,658,428 | 4/1987 | Bedros et al. | 382/46 |

*Primary Examiner*—Leo H. Boudreau
*Attorney, Agent, or Firm*—Bromberg, Sunstein & Casselman

[57] ABSTRACT

The invention in a preferred embodiment recognizes symbols by determining the center of mass and maximum extremity of a symbol candidate, and comparing it to a reference library after normalizing with respect to scale, orientation and center of mass.

2 Claims, 20 Drawing Sheets

PROCESSING

FIG. 13

NEW SEGMENT IN "NEW SEGMENT" (FORMAT = 0)

| WORD | | | | | |
|---|---|---|---|---|---|
| 1 | 0 | 0 | 0 | 0 | V |
| 2 | | | | | LJ |
| 3 | | | | | RJ |

END OF SEGMENT IN "MISSING VECTOR" (FORMAT = 1)

| WORD | | | | | |
|---|---|---|---|---|---|
| 1 | 0 | 0 | 1 | 0 | V |
| 2 | | | | | LJ |
| 3 | | | | | RJ |

END OF SEGMENT IN "TERMINATION PROCESSING" (FORMAT = 1)

| WORD | | | | | |
|---|---|---|---|---|---|
| 1 | 0 | 0 | 1 | 1 | V |
| 2 | | | | | LJ |
| 3 | | | | | RJ |
| 4 | | | | | MJ |

CONTINUATION VECTOR IN "SIMPLE OVERLAP" (FORMAT = 2)

| WORD | | | | | |
|---|---|---|---|---|---|
| 1 | 0 | 1 | 0 | 1 | V |
| 2 | | | | | LJ |
| 3 | | | | | RJ |

CONTINUATION VECTOR IN "Y JUNCTION" (FORMAT = 2)

| WORD | | | | | |
|---|---|---|---|---|---|
| 1 | 0 | 1 | 0 | 0 | V |
| 2 | | | | | LJ |
| 3 | | | | | RJ |

FIG. 14

CONTINUATION VECTOR IN "L JUNCTION" (FORMAT = 2)

WORD

| 1 | 0 | 1 | 0 | 0 | V |
|---|---|---|---|---|---|
| 2 | | | | | $L_J$ |
| 3 | | | | | $R_J$ |

INCREMENT SCAN NUMBER IN "REAL TIME PROCESSING" (FORMAT = 3)

WORD

| 1 | 0 | 1 | 1 | 0 | 0 | 0 | 0 | 0 | 0 | 0 | 0 | 0 | 0 | 0 | 1 |
|---|---|---|---|---|---|---|---|---|---|---|---|---|---|---|---|

END OF MAP IN "TERMINATION PROCESSING" FORMAT = 4)

WORD

| 1 | 1 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|

Y JUNCTION IN "Y JUNCTION" (FORMAT = 5)

WORD

| 1 | 1 | 0 | 1 | 0 | VM1 |
|---|---|---|---|---|---|
| 2 | 0 | 0 | 0 | 0 | V |
| 3 | | | | | $L_J$ |
| 4 | | | | | $R_J$ |
| 5 | | | | | $L_I$ |
| 6 | | | | | $R_I$ |

L JUNCTION IN "L JUNCTION" (FORMAT = 6)

WORD

| 1 | 1 | 1 | 0 | 0 | VM1 |
|---|---|---|---|---|---|
| 2 | 0 | 0 | 0 | 0 | V |
| 3 | | | | | $C_J$ |
| 4 | | | | | $E_J$ |
| 5 | | | | | DELS |
| 6 | | | | | $L_I$ |
| 7 | | | | | $R_I$ |

FIG. 21

J REGISTER (VECTOR NUMBER = V)

| NAME | $C_{R0}$ | $E_{R0}$ | $T_{R0}$ | $S_{R2}$ | $L_{R2}$ | $R_{R0}$ | DC | CP | DE | EP | MISSED | NV |
|---|---|---|---|---|---|---|---|---|---|---|---|---|
| # BITS | 16 | 16 | 8 | 16 | 16 | 16 | 18 | 24 | 18 | 24 | 4 | 12 |

K REGISTER (VECTOR NUMBER = V+1)

| NAME | $V+1$ $L_{R2}$ | $V+1$ $R_{R2}$ |
|---|---|---|
| # BITS | 16 | 16 |

I AND I+1 REGISTERS

| NAME | $C_I$ | $E_I$ | $L_I$ | $R_I$ | $C_{I+1}$ | $E_{I+1}$ | $L_{I+1}$ | $R_{I+1}$ |
|---|---|---|---|---|---|---|---|---|
| # BITS | 16 | 16 | 16 | 16 | 16 | 16 | 16 | 16 |

METHOD AND APPARATUS FOR VECTORIZING DOCUMENTS AND SYMBOL RECOGNITION

This is a divisional of co-pending application Ser. No. 475,037, filed on Mar. 14, 1983.

DESCRIPTION

This invention relates to devices and methods for compactly converting planar drawings to coded digitized information for subsequent storage, printing and editing, and to such devices used for symbol learning and recognition.

BACKGROUND ART

Digital coding of graphic information is commonly called for in a wide variety of contexts from facsimile data transmission to computerized photograph analysis and pattern recognition, to computer-aided-design applications. The first step in such digitizing is to scan the document in a controlled fashion, measuring the graphic value of the image at each point. Currently available scanning devices are capable of substantially simultaneously delivering a binary output signal for each of n lines of resolution cells, each cell being approximately 0.01 mm square. Thus a one meter long scan line of an engineering drawing for example would contain $10^5$ such resolution cells; a single square centimeter would contain $10^6$ resolution cells.

In practice there is a high degree of repetition of graphical values in any image, and accordingly with the extreme volume of digitized graphical values produced by scanning even the simplest images, it is necessary to employ coding techniques, or, more colloquially, pattern recognizing techniques, to reduce the required volume of stored or transmitted data. The simplest such technique is a one-dimensional information compression, such as run-length encoding, in which for each scan line a string length and starting coordinate are coded only when the value of a string of consecutive resolution cells changes. Where, as indicated above, the digitized information is in the form of raster output data from 0.01 mm resolution cells, a typical 80 character alphabetic line might then be coded as approximately 200 information signals for each 20 cm long scan line, a reduction of 99 percent compared to the $2 \times 10^4$ bits of raw raster output data. When it is considered that a sheet of A4 paper contains $6 \times 10^8$ such resolution cells, it can be seen that such a coding is still very cumbersome, requiring over a million information signals to code a single page of bi-tonal writing, scan line by scan line. This inefficiency is addressed in the prior art by a number of techniques which look for broader patterns by correlating the run length compressed data across a second dimension, typically by comparing contiguous adjacent scan line data and coding the difference.

Among such techniques are those shown in U.S. Pat. Nos. 3,937,871; 4,213,154; and 4,189,711. Another technique of two dimensional encoding involves designing circuitry specifically to efficiently recognize particular kinds of patterns encountered in a fixed use. U.S. Pat. No. 4,307,377, for example, shows a device which codes narrow straight lines, and which approximates narrow curved lines by a segmental approximation. That patent claims a 97 percent reduction in the amount of data required to be stored, although it is not clear what the base technique for such a comparison is.

Each of the above techniques, while offering a significant reduction in the amount of data required to be stored as compared to the raw raster output, has its drawbacks. Typically the coding techniques which correlate successive scan line intercepts require the coding of some data for each scan line intercept, and do not produce an output indexed to provide simple access for editing or for addressing portions of the stored image. The method shown in U.S. Pat. No. 4,307,377 avoids these problems for certain graphic elements, but does not offer as significant a data reduction in coding of images other than thin lines. As an example of the limitations of prior art, when applied to a document containing only a vertically oriented black isosceles triangle, centered on the page, none of the foregoing coding techniques would give an output as compact as the intuitive mathematical description comprising two linear equations and the top and bottom y-coordinates; nor would the coding output of such prior art devices indicate that such a simple image was being scanned. What is needed is a single device which quickly recognizes patterns and compactly codes the information contained in general two dimensional drawings containing both line drawings and shaded image portions, and which develops an output useful for the extraction of higher level information such as written characters.

BRIEF DESCRIPTION OF THE INVENTION

The present invention overcomes the foregoing limitations by real-time processing of raster scan information using data maintained in a small memory describing each significant graphic element, or vector, which has been encountered in the preceeding M scan lines. In a preferred embodiment, the "vectorized" description in memory includes functions of two coordinates, such as center line and width, which locally represent the graphic element as a trapezoid. As the document is scanned, these vector descriptions in memory are continuously updated and the descriptive parameters refined. When a vector ends, encounters a branch point, or when a new vectorization is required to represent the graphic element scanned, a compactly coded vector description is sent as an output, together with a code signal indicating the presence of a branch point with another vector if applicable, and the corresponding address in memory is freed up to accomodate another vector. At each point during the real time processing of raster data a number of parallel arithmetic logic units compare a scan line intercept or run with a vector in memory, and no additional coding is performed unless new information is encountered. The entire coding process is done as a single pass operation, at a speed comparable to the scan speed, yet putting out immensely compact data. In the above cited example of a solid triangular image centered on the page, for example, the device would, upon passing M scan lines below the bottom of the triangle without encountering any continuing vector, cause to be produced as an output a code indicating the vector had terminated, the address in memory of the vector parameters, and its last encountered left and right edge coordinates. The data in memory would include the coordinates of the top of the triangle, and two linear functions describing its center line and width. (The ending scan line number would automatically be registered on a common synchronizing bus for various components of the system.) Thus, fewer than ten integers would fully describe a figure which in the case say of a three centimeter tall triangle with an area of 10 square centimeters would include $10^7$ resolution cells spanning $3 \times 10^3$ scan lines. For a more complicated figure, e.g., a region bounded by a simple closed curve, the output would contain similarly compressed data representing the figure by numerical parameters giving a linear geometric approximation by included trapezoids. In one preferred embodiment of the device, the apparatus includes a keyboard-selectable means of varying the integer parameter M which determines the number of scan lines which a "missed" vector will be held in memory before it is recognized as terminated and caused to be output. The preferred embodiment also includes a keyable thresholding means, in which the user selects an upper and lower threshold limit (MINTRO and MAXTRO) for the dimensions of images the machine will recognize as noise—e.g. line edge irregularities, ink spots or voids. The apparatus then varies an intermediate threshold testing parameter between the two limits as a function of the dimensional traits of the vector under consideration near a particular scan line, so as to optimize the parameterization of the vector within a small number of scan lines, while rejecting as noise any information contained in runs smaller than the threshold level. In another embodiment, the apparatus sorts the vectorized images by dimensional and topological criteria to identify symbol candidates, determines the center of mass and maximum extremity of the symbol candidate, and transposes the candidate to a standard orientation and scale. The normalized candidate is then recognized by comparison to a preselected or learned library of symbols.

These and other features of the invention will be more clearly understood by reference to the drawings.

BRIEF DESCRIPTION OF THE DRAWINGS

FIGS. 13 and 14 are tables showing the data included in output records at the various processing and coding stages.

FIG. 21 shows the information maintained in the I, J and K registers in a preferred embodiment of the vectorizer.

These and other features of the present device will now be more fully explained.

DETAILED DESCRIPTION OF THE INVENTION

Figure 1:
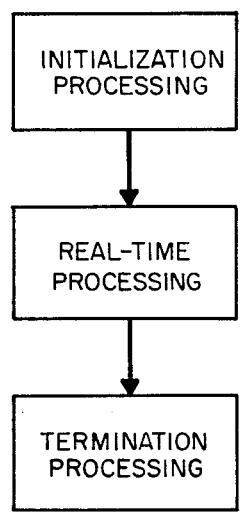
FIG. 1 is a block diagram of the operation of the present device.

Referring now to FIG. 1 there are indicated the three stages involved in processing or "vectorizing" a document according to the present invention. Generally, the present invention takes raster output data and concurrently converts it into compactly coded data representative of raster scanned graphical elements depicted on engineering drawings or the like. The coding is performed by representing each graphical element in an image as an approximation including one or more trapezoids, and storing the parameters of trapezoids so describing currently intercepted portions of the image in a memory. Each trapezoid in the approximation of the image is referred to in this description and the following claims as a "vector". (It should be noted that, contrary to normal usage, the "vectors" referred to herein have "width" as well as longitudinal orientation.) Input raster data related to a given small region is then compared to memory data for nearby regions and relevant information relating thereto is encoded. The memory data, for each vector, includes an ordered block of information derived from processing prior scan intercepts of the related graphic element. This block of information is also sometimes called below a "vector". The first stage in processing, labeled INITIALIZING PROCESSING in FIG. 1, requires defining several pointer vectors, which will depend on the size of document scanned, as well as ordering the memory, and undertaking the initial hand-shaking procedures with the output processor and the data compression unit. The second major stage depicted in FIG. 1 is the real time processing stage. During this stage, binary raster output data is fed, via a data compression interface unit, to the processor. The processor then sequentially compares the incoming segments of raster data with vectorized information in its memory, developing an output when necessary. When the processor determines that a given vector resulting from raster data is terminated at a given scan line, an output is made; however a graphic element may continue as a single vector to the end of the document being scanned. Accordingly in a final stage, denoted TERMINATION PROCESSING in FIG. 1 the device forces outputs for those vectors which have not already terminated, and gives appropriate termination signals to other units of the apparatus.

Figure 2:
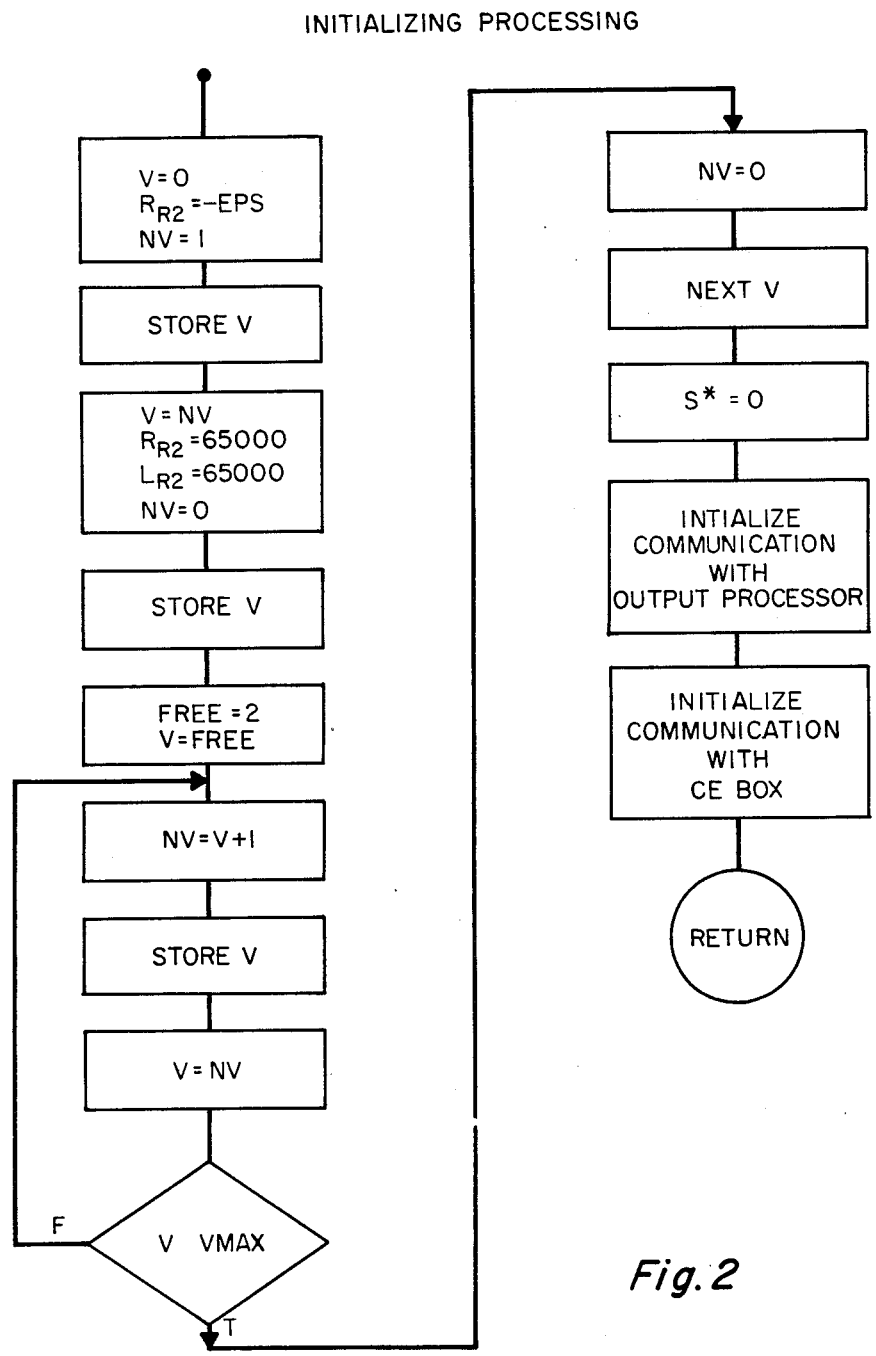
FIG. 2 shows the steps involved in the initialization processing.

In FIG. 2 are shown the steps involved in the INITIALIZING PROCESSING according to the present device. Generally, the use of the symbol [=] in the drawings means "is replaced by" or "is set equal to", as is commonly understood in computer systems design. As used in the figures, V stands for the vector under consideration. NV is a variable representing the next vector in the memory. S* denotes the current scan line number. The symbols R, L denote the right and left edge coordinates of a run. Where used with an I (or I+1) subscript (e.g. $R_I$) the edge coordinates refer to the corresponding right or left edge data in the I (or I+1) register of current input segments. (These registers are described below.) A subscript $R_2$ refers to the edge data from the vector in the J-register, which will normally be the edge data from a previous scan of the graphic element related to the I or I+1 register run. Finally the subscript R0 when used with the quantities C, E, or S denotes the value of the center, extent or scan line number respectively of a memory vector at the scan line where that vector record commences; when used with the threshold function T, $TR_O$ denotes the last-computed value of the threshold function T, which is updated each time the center and edge predictor slopes are refined, as will be further explained with reference to FIG. 6. Returning now to FIG. 2, as indicated in the uppermost left hand box of FIG. 2. Vector number 0 is defined as a zero width vector with right hand edge has coordinate $-\epsilon$. This is a sentinel vector with fictitious or impossible coordinates, used to designate the left hand side of the document. The next vector, vector number 1, is also a fictitious sentinel vector, and is defined in the third box down, as one having its left and right edges at scanner resolution element number 65,000. This is a vector of zero width located at the right hand edge of the document, the number 65,000 corresponding to the case of a document having a 65,000 resolution cell scan line width. The remainder of the steps shown in the left hand column of FIG. 2 amount to establishing a numerical order of the addresses in the random access memory. In one embodiment of the device currently operating, this memory accomodates $2^{10}$ words, each word being 188 bits long. It has been found that a memory of this size is generally more than adequate for the processing of even very dense engineering drawings. In the right hand column of FIG. 2 are indicated the remaining steps of the initializing processing. Namely, after the two sentinel vectors V=0 and V=1 have been defined and the random access memory fully ordered, the device is set for scan line zero at the left hand side, and signals are output to prepare the output processor for receiving data and to initiate input of data from the data compression box.

Figure 3:
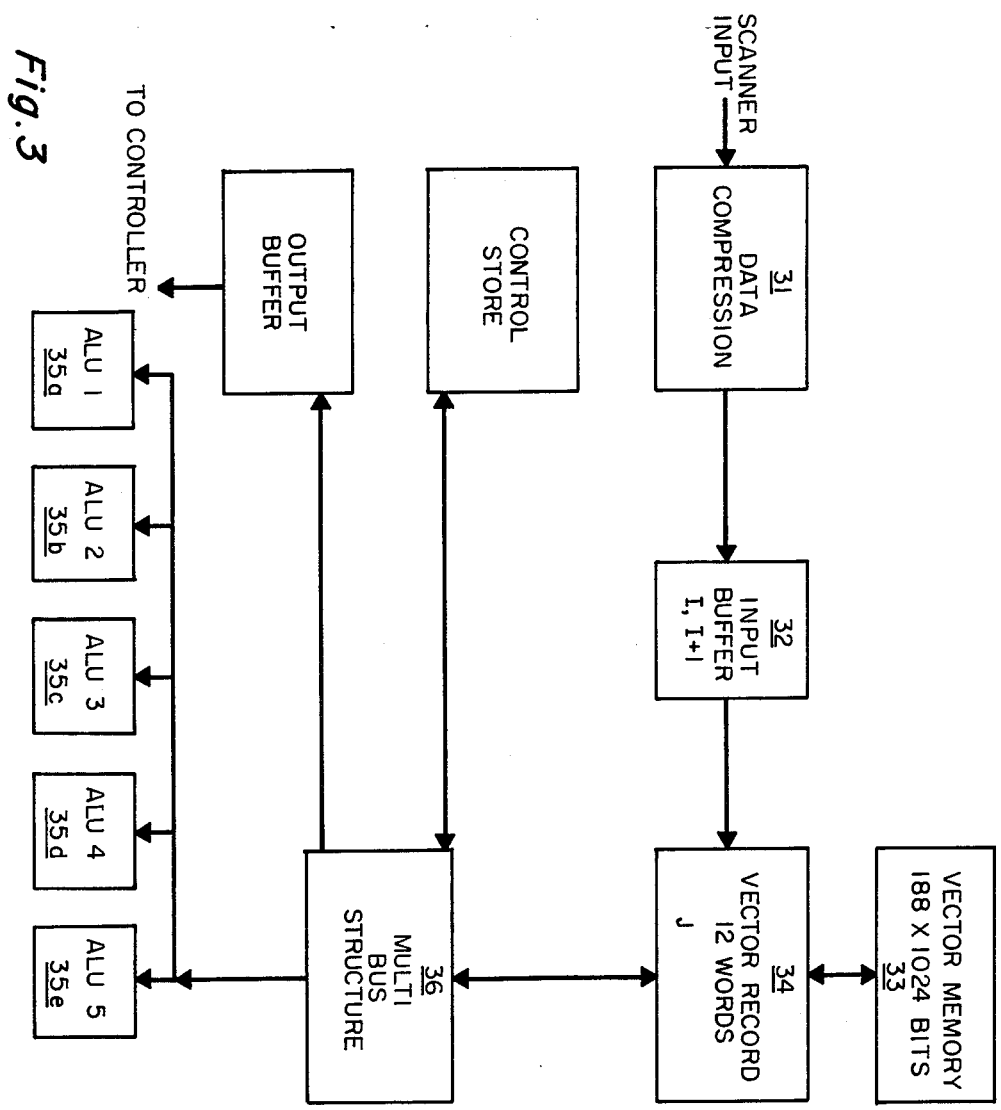
FIG. 3 is a block diagram of the processing apparatus showing major functional units.

Turning now to FIG. 3 there is shown a block diagram of the vectorizer according to the present invention, in which scanner input is fed to a data compression circuit 31 which extracts, from each run of like-valued bits, the coordinates of the center point, C, the scalar extent E or half-width of the run, and the coordinates of the left edge L and right edge R of the run. Logically this information is redundant, inasmuch as the first two values may be computed from the second two, but as a practical matter the creation of an ordered 4-tuple of data values for each input run or segment can be done in real time at the input stage, and doing so avoids greater complexity in the later processing. The ordered (C,E,L,R) information is fed to an INPUT BUFFER 32 which contains two registers denoted I, I+1, which hold compressed (C,E,L,R) data related to two consecutive input segments. The device processes the information in the input buffer by sequentially comparing coordinates of input segments to a corresponding "vector record" held in a vector memory 33 and temporarily loaded into a single register 34 called the J register.

A common multibus structure 36 connects the various registers to a plurality of arithmetic logic units shown as 35a–35e so as to deliver corresponding center or edge coordinates of segments being processed to the ALUs 35a–35e. The use of multiple ALUs and a multibus structure together allow numerous arithmetic comparisons on different sets of coordinates to be carried out in parallel, so that relevant dimensional and topological data may be quickly ascertained. The J register 34 as noted is loaded at a given time with a vector record from the memory 33. Each record is an ordered string of words derived from the processing of previous input segments, and contains in addition to the edge coordinates intercepted by the most recent scan line a variable threshold number $T_{RO}$, which governs processing parameterization steps, the original scan line number $S_{RO}$ with which the record commences, and linear predictor functions DE and DC from which the center point and half-width or extent of the input may be predicted. The precise contents of the vector record and the use of each coordinate or other parameter will be clearer with reference to FIGS. 7–12, and 21.

Figure 4:
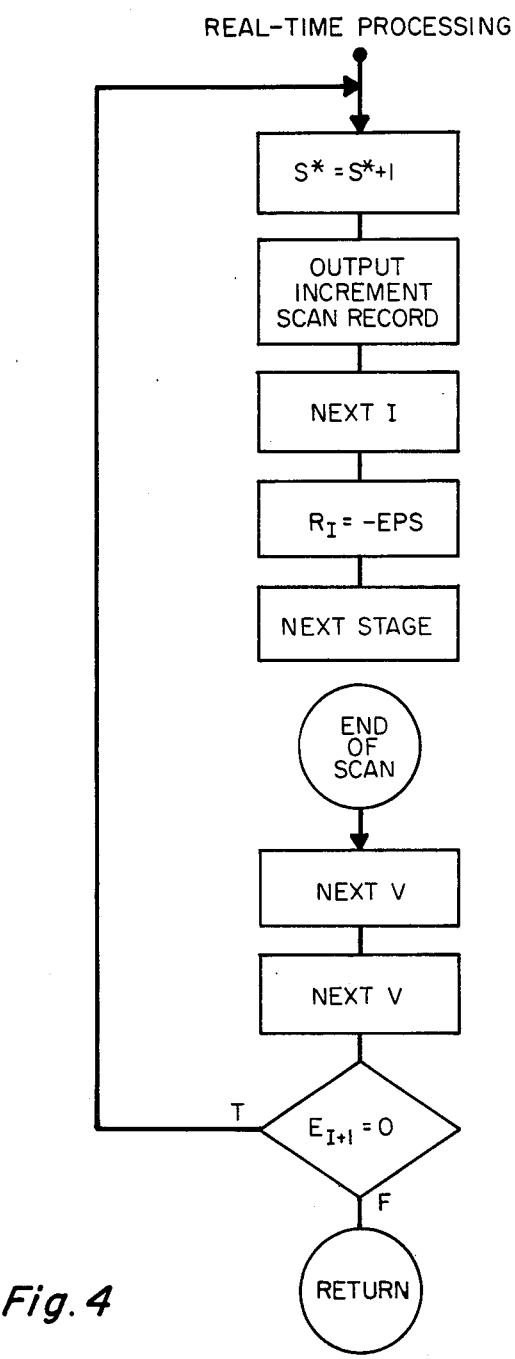
FIG. 4 is a flow diagram of the real time processing steps involved in coding a document.

Referring now to FIG. 4 there are shown the steps involved in REAL TIME PROCESSING. Initially the scan line is incremented by one, and a 16-bit binary word is output to the output processor indicating this increment. The next input to the I register, which generally receives the center, extent and edge coordinates of the next scan line intercept from the data compression module, is loaded, and inasmuch as the I registers will initially contain irrelevant material such as the right hand sentinel vector or the left hand sentinel vector for the new scan line, the right edge is arbitrarily set to $-\epsilon$. This flushes the I registers and prepares the processor for NEXT STAGE processing, shown in FIG. 6.

The NEXT STAGE processing is a sorting step, in which the information in the I register is processed by the parallel arithmetic logic circuitry in an acceptably short time. As noted before, the coding process occurs in real time and must be accomplished at substantially the same rate as scanner data is fed into the system. In NEXT STAGE processing, a given vector intercept is determined to be one of the following: a branch of a lamda junction, a trunk of a Y junction, a new segment, or a simple overlap (also called a continuation) of an existing vector. In order for the coding to proceed without inordinate demands upon storage or memory, and without requiring delays or halts of the scanning operation, the determination as to which one of the above four topological and geometric properties applies is made by performing simple arithmetical tests upon the left and right edges of a vector from memory (held in the J register) and an input record from the data compressor, held in the I or I+1 register. These arithmetic comparisons are done in parallel by four of the arithmetic logic units 35(a)–(e) shown as ALU1–ALU5 in FIG. 3; the timing signals from a timing control unit causing the appropriate edge coordinates to be automatically delivered to the ALU along busses for such processing.

Figure 5:
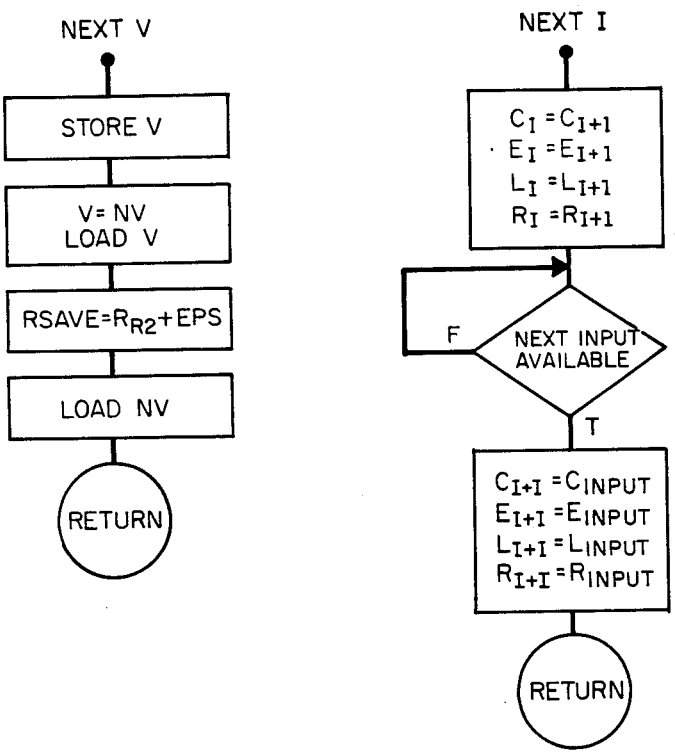
FIGS. 5-12 are logic charts and flow diagrams indicating the precise method of coding as well as the method of thresholding, or hole filling, and provisional coding or missing vector processing, techniques employed in the present device.

Turning now to FIG. 5 which indicates the processing denoted NEXT I, it can be seen that the center, extent, left and right edge coordinates in the I+1 register are transferred to the I register, and if there is an input available from the data compression unit, then the coordinates of the center, extent, and left and right edges of the next available input are loaded into the I+1 register. In this manner there are always available the C, E, L and R data for the next two intercepts along a scanned line for processing by the processor. In addition to these two records being processed, the processor has available in the J register a complete vector record, comprising 188 bits more or less of informaton as will be more specifically outlined below. This J register record shown in FIG. 21 is the most recently updated record for a particular vector in the main memory. This main memory record contains predictive parameters for the vector under consideration as well as the scan line number where it first appeared and its last measured center, extent and left and right edges, all of which will be loaded into the J register at a given time for processing of input data from intercepts below it in the next subsequent scan line. This vector from main memory is referred to generally as a "superadjacent vector" in relation to graphic intercepts directly or contiguously below it and for which it may constitute a connected portion of a continuation or a Y or lambda member. The active vector segments in the memory are continuously re-ordered in a forward link-list during processing so that the processor addresses them in the order they are encountered, from left to right, so that there will be at most two "superadjacent" vectors for a given intercepted segment.

Also shown in FIG. 5 is the NEXT V processing. In these processing steps the preceding vector is stored, V is set equal to the next vector in memory, which is loaded into the J-register. The quantity RSAVE, a temporary processing number equal to plus the right hand coordinate of the vector is saved, and the next vector NV is loaded into the K register. (The quantity RSAVE is next used in a simple coordinate comparison to detect whether a branch point has been scanned.)

Figure 6:
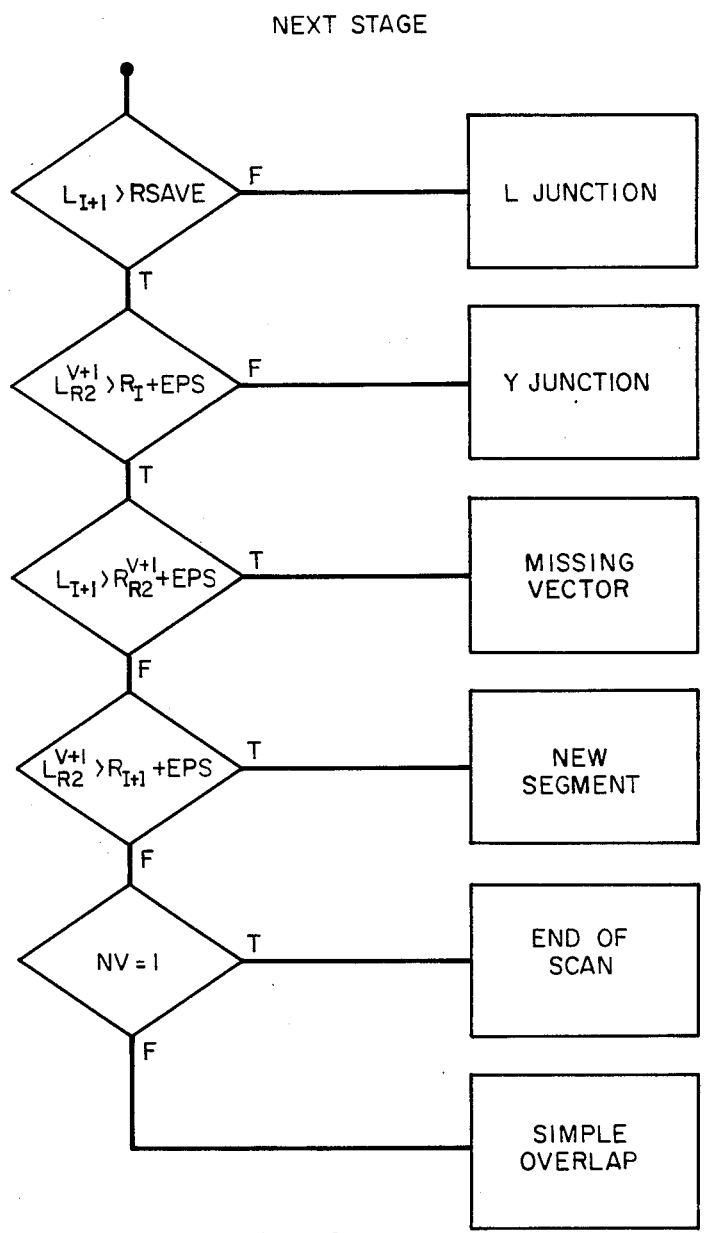

Turning now to FIG. 6 there is shown the stage of processing designated NEXT STAGE processing, in which edge data for the vector, or vector intercepts in the J, or I, and I+1 registers respectively are selectively compared by four parallel arithmetic units and, according as the respective arithmetic inequalities are true or false, is fed into a subsequent processing stage as indicated in the six boxes on the right hand side of FIG. 6. Inspection of the logic diagram of FIG. 6 reveals that for a given geometrical configuration, the arithmetic comparison tests outlined in the flow diagrams of the left hand column will lead to one and only one of the process boxes in the right hand column of FIG. 6. In particular the top left hand logic test indicates that only if the left edge of the I+1 input is not greater than the right edge coordinate RSAVE is the intercept represented in the I+1 register processed and coded as an L-junction. The quantity RSAVE is defined to be initially $-\epsilon$, and generally is equal to the right hand edge of the vector in the J register plus $\epsilon$. Similarly going to the second logic branch box, only if the left hand edge of the next vector to be loaded in the J register is not greater than the right hand edge of the I intercept vector plus $\epsilon$, and it has passed the preceeding test does the I register intercept get processed as the trunk of a Y junction. In the preferred embodiment of the invention, since only the current left and right edge coordinates of the next vector are needed for branching tests, these coordinates are loaded into a small register, the K register, to be available for this processing. The contents of the K register are shown in FIG. 21.

Continuing down the logic diagram of FIG. 6, only when having passed the preceeding two tests, if the left edge of the I+1 intercept is greater than the right edge of the K register vector plus $\epsilon$, does the apparatus recognize that an expected intercept below the v+1 vector was not encountered at all and accordingly the "MISSING VECTOR" processing comes into play to provisionally maintain the memory addressing of vectors and predictive data while ascertaining whether the J vector has in fact terminated or whether an unintended void in the drawing was scanned. Continuing down the left hand side of the logic diagram of FIG. 6, if a scan line intercept held in the I+1 register has passed the first two tests with logic 1 and the third with logic 0 and also satisfies the inequality that the left edge of the K register vector is greater than the right hand edge of the intercept in the I+1 register plus $\epsilon$, the I+1 input is determined to be a NEW SEGMENT and is processed accordingly. Finally, if the next vector equals 1, that is the sentinel vector of width 0 centered on the right hand edge of the page as defined in the initializing processing, then the scan line has ended and signals are generated to initiate the next scan. Otherwise having passed through the logical diagram at all five steps, the input under consideration is a SIMPLE OVERLAP (or continuation) of the vector corresponding to it on preceeding scan lines, and will be processed as a SIMPLE OVERLAP or continuation vector. The processing appropriate for each one of these six determinations is shown in FIGS. 7 to 12 only one of which processing stages will be activated for a given input.

Figure 7:
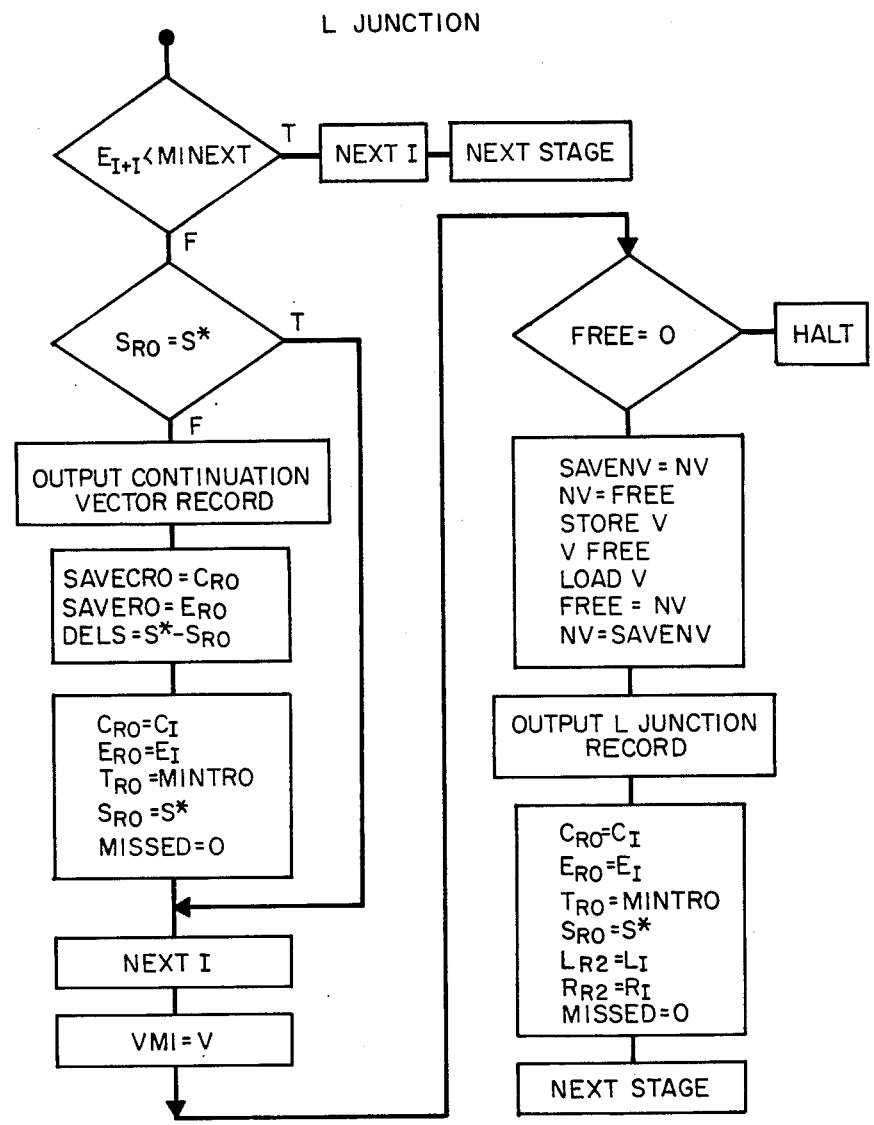

Turning now to FIG. 7 there are shown the processing steps for the scan line intercepts from register I+1 when the arithmetic comparison tests of FIG. 6 have determined the input to be a lambda-JUNCTION. In this event, the extent of the input is first checked to be greater than a preset minimum extent.

The term "extent", represented by E with an identifying subscript, is used throughout this disclosure to refer to one-half of the width of a run. A rounding-off convention is arbitrarily established to assure integral coordinates for the center point and the extent of a run. The scalar quantity MINEXT of FIG. 7 is a preselected number which acts as a threshold for screening out certain kinds of noise that would otherwise be processed as branch point indicating data. For example certain graphic reproduction processes create microscopic streamer lines of dark density along a dark edge. Such noise may be eliminated from the further level processing steps. The choice of MINEXT may also be dictated by the knowledge that a drawing contains only, e.g., lines of a certain minimal thickness. A suitable choice on MINEXT screens out all lesser-dimensional features, so that processing time will not be used to process such noise. If it does not satisfy this threshold requirement it is disregarded, the next input is loaded and next stage processing is again commenced. On the other hand, if the extent of the I+1 intercept is larger than MINEXT then the device determines whether the present scan line is the first scan line on which this vector appeared. If not, an output continuation vector record is produced, whereby the description of the vector as far down as the branch point is sent as an output (typical output records are shown in detail in FIGS. 14-15), and the new vector data for the left leg of the lamda replaces the former vector data in the memory. The quantities C, E and S in the J register are temporarily saved as they will form part of the L-junction output record and the vector in the J register is given new C, E and S data descriptive of the branch of the L-junction being processed. The processor then takes the next input, gets a free vector address, and uses it to reorder the vectors in memory, in such way as to start a new vector comprising the right leg of the lamda junction as the next sequentially addressed vector after the left leg, which has been coded as a continuation of its top part. An L-junction record, FIG. 14, is generated identifying the top vector and its relation to the right leg of the junction. During both the entering in memory of the left leg and of the right leg, the parameter "MISSED" is set to zero and the parameter $T_{RO}$ is set to MINTRO, as is done initially when commencing any new vector parametrization. The significance of this latter step will he discussed later in connection with FIGS. 11 and 12.

Figure 8:
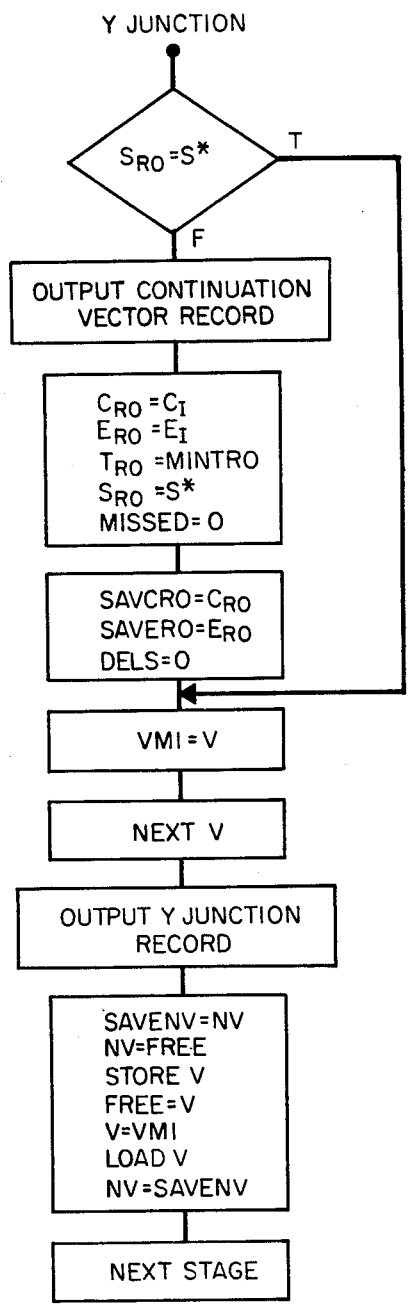

Turning now to FIG. 8, there is shown a block diagram of the processing undertaken in the event that the arithmetic comparison testing of FIG. 6 indicates a given intercept to be a Y-JUNCTION. Initially there is tested whether the present scan line is in fact the first scan line for the vector. If it is not, a continuation vector record is sent as an output, as indicated in FIG. 13 and the C, E, S, TRO and MISSED data are put into the J register as a continuation of the upper left branch of the Y, thereby acquiring its memory address. This data is put back in main memory, an output Y-junction record is produced and the vectors are reshuffled so that the former right branch of the Y-junction junction is no longer in memory and existing vector records are again consecutively addressed. The processor then returns to NEXT STAGE processing of FIG. 6.

Figure 9:
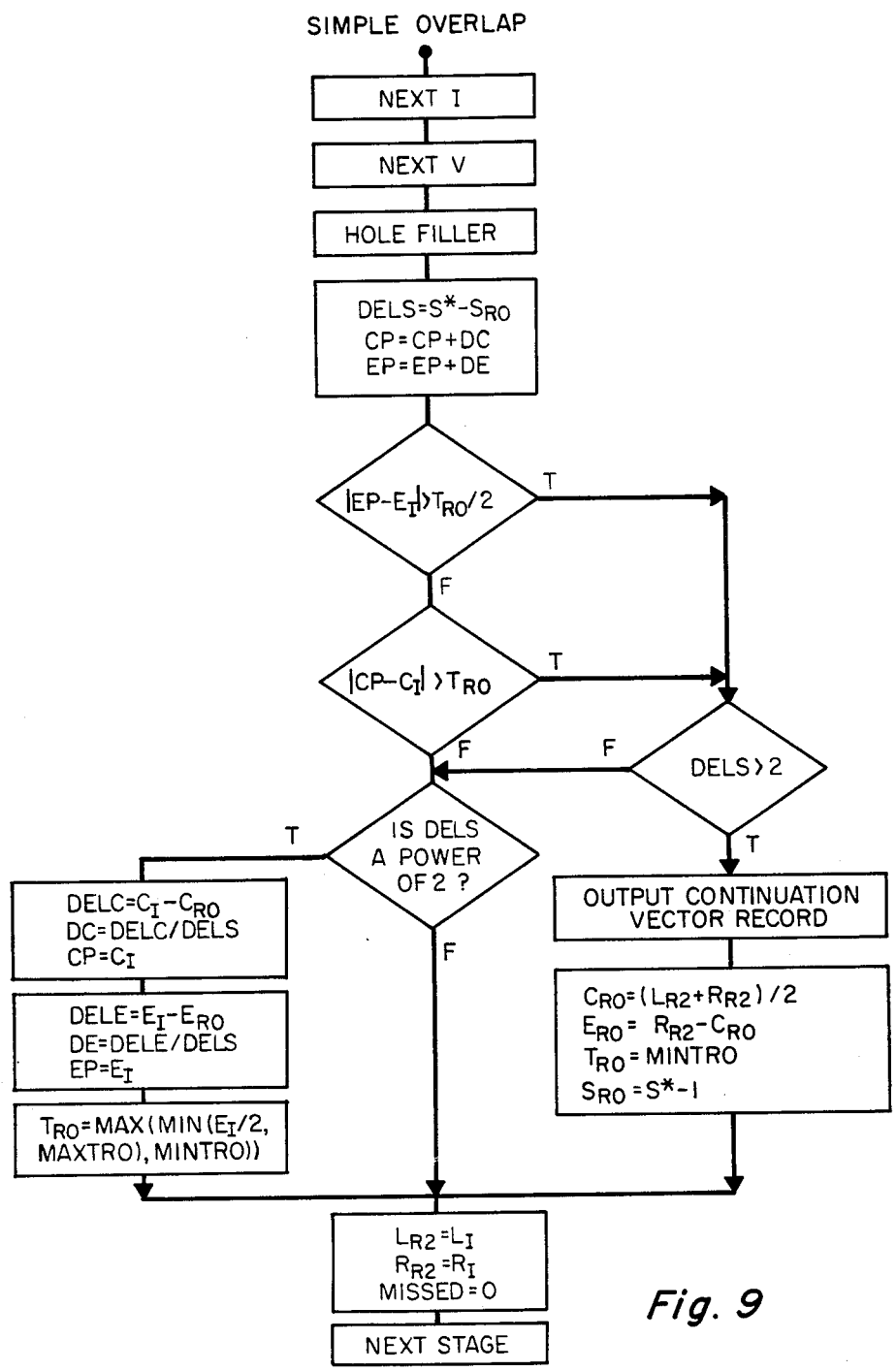

Turning now to FIG. 9 there is shown in the alternative the processing which occurs in the event that the arithmetic testing of FIG. 6 indicates the given intercept to be a SIMPLE OVERLAP (or continuation) of a previously encountered superadjacent vector. As used throughout this disclosure the term "superadjacent" refers to an unterminated vector encountered in a previous scan line and which is located so that its width to some extent overlaps or is next to the given intercept in x coordinates. As indicated in FIG. 9 SIMPLE OVERLAP processing commences by loading the next input, getting the next vector from memory, and undertaking the holefilling processing (explained below in relation to FIG. 12). Whereas the lambda- and Y-junction tests each involve extracting information related to the topological connectivity of different segments, the SIMPLE OVERLAP processing is the major information compressing step of vectorization and involves creating and refining a piecewise linear approximation to the image represented by the consecutive scan line intercepts. The parameter DELS is set to be the number of scan lines betweem the present scan line and the scan line where the vector was initially encountered. The numhers DC and DE are the slopes respectively of linear functions representing the center and the extent. As noted previously a parameter $T_{RO}$, the threshold parameter, is set which indicates the degree of error which will be permissible in the vectorized approximation of the image scanned. In the SIMPLE OVERLAP processing step, the processor initially determines whether the extent of the intercept stored in the I register differs from the extent predicted from memory by more than $T_{RO}/2$, and if not whether the center of the I register intercept differs from the predicted center by more then $T_{RO}$. In either case, if greater than two scan lines have elapsed since the vector was first encountered, the vector continuation record will be sent as an output and a new vector approximation will be commenced using the current data, with the new center, extent, and scan line as the relevant vector data, with the parameters $T_{RO}$ set to the minimum and MISSED set to 0 as will be explained in regard to FIGS. 11 and 12.

Still in reference to FIG. 9, in the event that both the center and edge predictions are within the threshold amounts required, the device performs an additional arithmetic check to determine whether the current scan line is $2^n$ (n an integer) scan lines down from where the vector was initially encountered. If not, the current left and right edges are simply entered in the J register, the parameter MISSED is set to 0 and the apparatus proceeds to the NEXT STAGE processing. On the other hand, if the number of elapsed scan lines since commencement of the vector is a power of 2, then the lower left hand branch of the processing diagram is implemented and the parameters DC and DE are updated using present scan line data, to give a new estimate of the slope of the center line and the slope of the extent function. It will be appreciated that since this refinement of parameters occurs after a power of 2 number of scan lines, and when the edge and center predicters have already been determined to be within the respective threshold parameters $T_{RO}$ in absolute value, the linear approximation to the vectorized shape of the underlying image is refined so that when a vector continues to appear for an increasing number of scan lines and the previously vectorized approximation still holds good, the linear predictors are exponentially bounded and give a smaller and smaller error from the actual image. Finally note that in addition to updating the center and extent predictors, the parameter $T_{RO}$ is updated in accordance with the formula shown in the third box of the lower left hand branch of the processing block diagram. Specifically, when the half width of the I register intercept is less then MAXTRO but greater than MINTRO, then the refinement of parameters will set TRO equal to this half width. Thus, the threshold parameter is adaptive, so that when the graphic features being processed are less then twice the width of MAXTRO, a closer degree of accuracy will be required of the estimations. This allows the processor to very quickly code information encountered in thick images and yet to more delicately catch the detail of fine graphic images, and to more quickly establish its predictive parameters when commencing to code a new vector. Finally we note, again referring to FIG. 9, that in any case, whether the slope parameters are updated at a power of two scan line, whether the existing data feeds straight through at a non power of two scan line, or whether the edge or center predicter has failed the threshold accuracy test and a continuation vector is sent as an output, the left and right edge data in the J register have substituted in them the coordinates of the current left and right edges, and the value of the parameter MISSED is set to 0 before processing control shifts to the next stage and the J register data is re-entered in memory.

Figure 10:
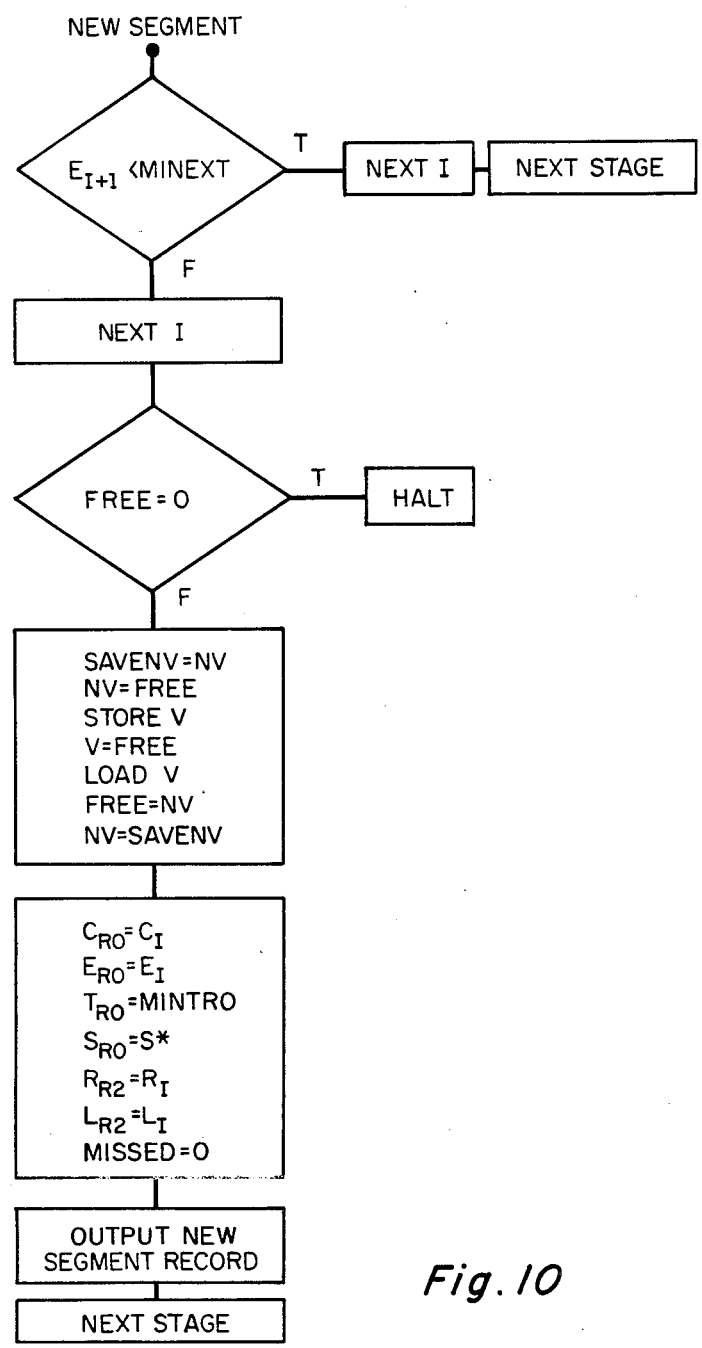

Turning now to FIG. 10, there are shown the processing steps undertaken in the event the arithmetic sorting process of FIG. 6 indicates the presence of a NEW SEGMENT. In that event, as indicated in FIG. 10, if the width of the input in the I+1 register is less than a specified minimum extent, the input is disregarded, the next input loaded, and the processing shown in FIG. 6 recommenced. Otherwise, the next input is loaded, and memory control is signaled to provide a free memory address for a new vector. If no memory address is available, as in the other processing steps wherein some shuffling of data in memory must be accomplished, the device halts. Otherwise the address pointers of the free vector and the next vector are rearranged, and the center, edge, threshold, current scan line number, and right and left edges of the new segment are placed in the J register with the parameter MISSED set to 0. An output record for new segment is produced as in FIG. 13 and the device proceeds to the next stage. It will be recalled that initial steps of the NEXT STAGE processing, FIG. 6, will return the J register contents to memory and proceed to sort out the next inputs according to the basic topological and geometric primitives of FIGS. 7-10.

Figure 11:
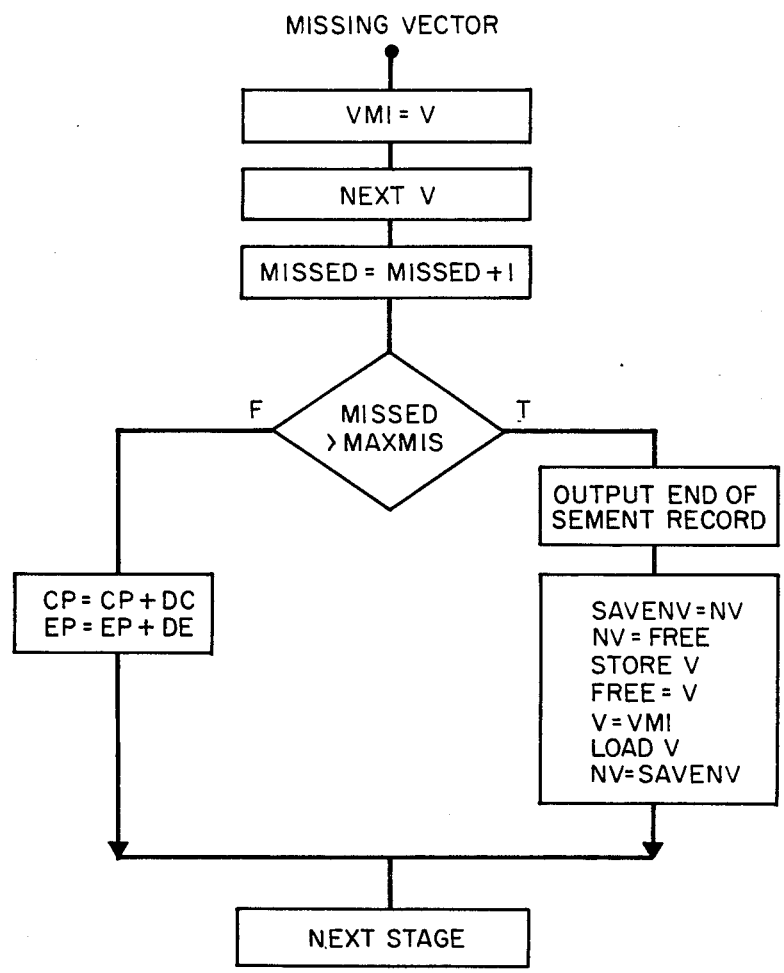

Turning now to FIG. 11 there are shown the operative steps of MISSING VECTOR processing. A given vector is retained in main memory when a continuation input fails to appear for less then M scan lines. The parameter MISSED, it will be recalled, comprises one of the 12 words of data constituting the vector description carried in main memory as discussed below in connection with FIG. 21; this parameter is updated by processing described presently. Provided that MISSED is less than a preselected number MAXMIS, the main memory vectorized description is retained and processing continues as usual, with the J-register edge and center predicters updated before returning to the memory as shown in the left branch of the processing diagram, FIG. 11. However, when the number of missed lines is incremented by one and becomes greater than the preset parameter MAXMIS (thereby indicating that the given vector segment has indeed terminated), an output record designating the end segment is generated as shown in FIG. 13. Thereupon the address of this vector is returned to the top of the free vector list in the memory controller, and the address pointers arranged accordingly, whereupon the processing proceeds to the NEXT STAGE. In this manner, when a predicted scan line intercept of a vector fails to appear, no new information is coded beyond the augmentation of the parameter MISSED by one unit, and no information is lost in reliance on such faulty data. In the event that after failing to appear for MAXMIS scan lines the vector is determined to have terminated, all of the provisional data entered in the preceeding MAXMIS scan lines is deleted and the output record goes back to the last actual scan line reading, as noted in the output record description, FIG. 13.

Figure 12:
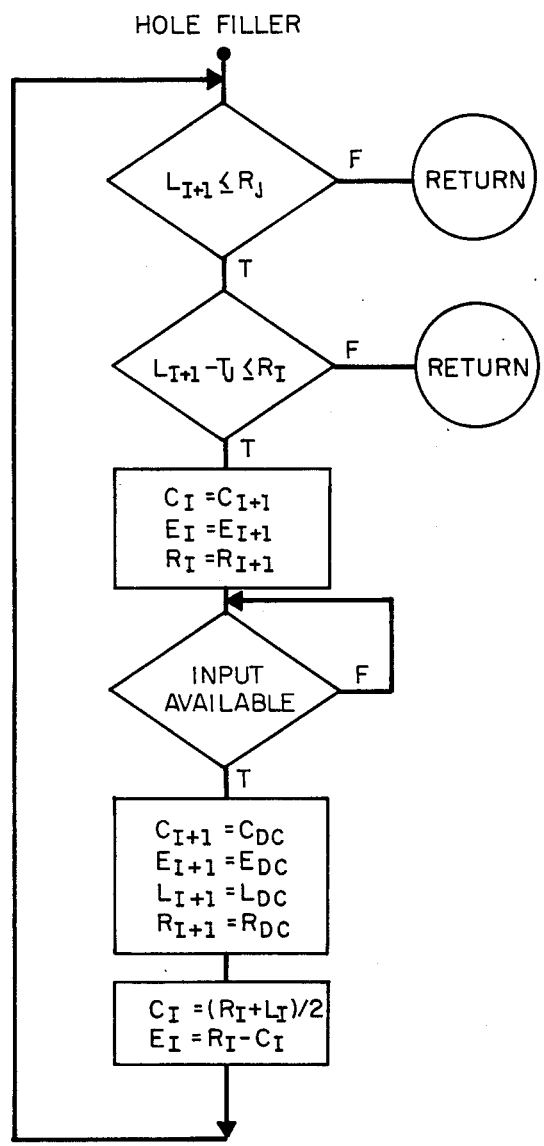

Turning now to FIG. 12, there is shown the processing operation of HOLE FILLING. This step is only required during the processing of a SIMPLE OVERLAP, and operates on new inputs, I, I+1, to delete runs of length less then $T_{RO}$ occuring in places where a run of another image value is predicted. Specifically, if the left edge of the I+1 input is less than the right edge in the J register of the corresponding vector, and if the left edge of the I+1 input minus the right edge in the I input is less than the threshold $T_{RO}$, then the left edge coordinate in the I register is saved, the C, E and R contents of the I+1 register loaded into the I register, and the next C, E, L and R coordinates from the data compression module are loaded into the I+1 register. The center and extent of the I register are redefined in accordance with $L_I$ and the new edge data $R_I$. In this manner holes of dimension less than $T_{RO}$ are automatically filled. A feedback loop then returns the device to the start of the hole filling operation, and it again undergoes the first two tests. This will result in filling of additional holes, in the event that a number of ink spots or voids occur in close proximity within a sole vector.

It will be seen that the foregoing processing steps result in the direct and straightforward coding of geometric and dimensional data for graphic images in real time for a scanner, with output data generated at each point where significant topological or dimensional information comprising new data is encountered. In FIGS. 13 and 14 are shown output records generated at these times.

In particular as appears in FIG. 14, when a branch point such as a Y-(or lambda-) junction is encountered and the output record for the terminated right branch of the Y (or new right leg of the lambda) is generated, the record includes the address VMI of the top left (or top) branch as well as the address V of the portion scanned. The output record in the case of a Y-junction includes the left and right edge coordinates of the upper portion as well as the left and right edge coordinates from the I-register of the lower right portion. For a right leg of a lambda-junction, the record includes the scan jump, center and exent data for the upper portion. This data, denoted $C_J$, $E_J$ and DELS for simplicity, comprises the quantities SAVCRO, SAVERO and DELS defined in FIG. 7. The particular choice of output records contains sufficient data regarding the topological and dimensional changes encountered so that by suitably programming an output processing device, it is possible to quickly print or access and display images generated by, e.g., a connected sub-unit depicted within a given drawing, or, for instance, the set of all electrical circuit units connecting to a given component in an electrical schematic when analyzed according to this method.

Figure 15:
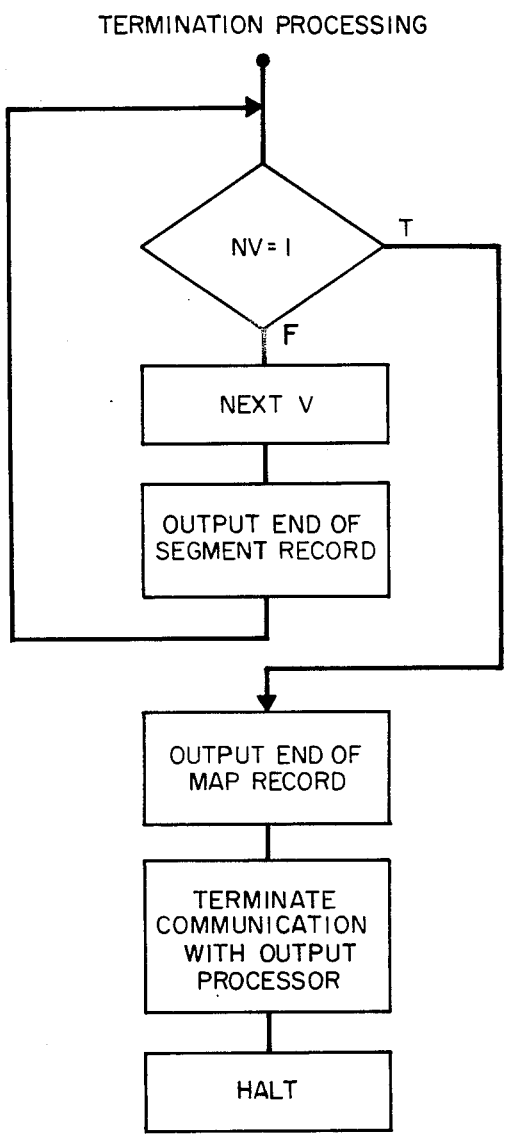
FIG. 15 shows the steps of termination processing according to the present invention.

A further point which has not been addressed in the foregoing discussion is the operation of the device in termination processing as indicated in FIG. 1. FIG. 15 shows the steps involved in such processing. It will be appreciated that because the graphic elements encountered in a given scan line are vectorized and stored in memory, and there is no output of such data until a significant change has occurred requiring a new vectorization of subsequent continuations or branches, it is possible for a document to reach its last scan without having generated an output record indicative of a graphic element which, for instance, has continued as predicted, or which quite simply has not terminated by the last scan line. In this event a termination processing mode is provided, which recognizes the last scan line by an externally triggered signal related to the document size, and proceeds to cause an output of an end-of-segment record for each of the vectors then left in memory. When the scan line is ended, that is when NV=1, the device then outputs appropriate signals to indicate the end of the coding operation and to terminate communication with the output processor and halt the apparatus.

It will be appreciated that the operation of the foregoing coding device utilizes a relatively small memory for 188 bit words which can be addressed and fed into the J register by appropriate signals for processing in relation to the scan data being fed into the I and I+1 registers. The various edge and center tests necessary for characterizing the current input and updating vector memory data are conducted in a straightforward way by parallel arithmetic logic units. Thus, although the use of parallel processing in this context constitutes part of the within invention, the design of arithmetic processing units is known to those versed in the art.

It will now be seen that the coding operations performed by the present invention produce a piecewise-trapezoidal approximation of each two-dimensional graphic element by extracting the graphic information in sequential scans and parameterizing small trapezoids (vectors) which locally approximate the graphic element.

For each graphic element, the memory is managed in such a way as to contain a block of data descriptive of a small trapezoid which approximates the currently scanned region of the graphic element. Coding is performed, and processed data is updated or caused to be output, only when one of five information containing events (Y- or lambda-branch, new vector, continuation requiring a fresh trapezoid, or end of vector) is encountered. These events, which are the information-theoretic primitives of the present invention, are mutually distinct and are complete in the sense that any run on a scan line (which is not noise, or which is not already accurately predicted by the vector data for the region above it) must constitute one of these events. Moreover the first four events may be determined by simple arithmetic comparisons, and the fifth by default, so that it is a straightforward matter for a person versed in the art to design four arithmetic logic units which collectively and in parallel will determine which of the "events" characterizes a given run.

In one embodiment the apparatus also performs symbol recognition on scanned documents in a manner explained below, using the vectorized representation to analyze the scanned symbol candidates, as will now be described.

Figure 16:
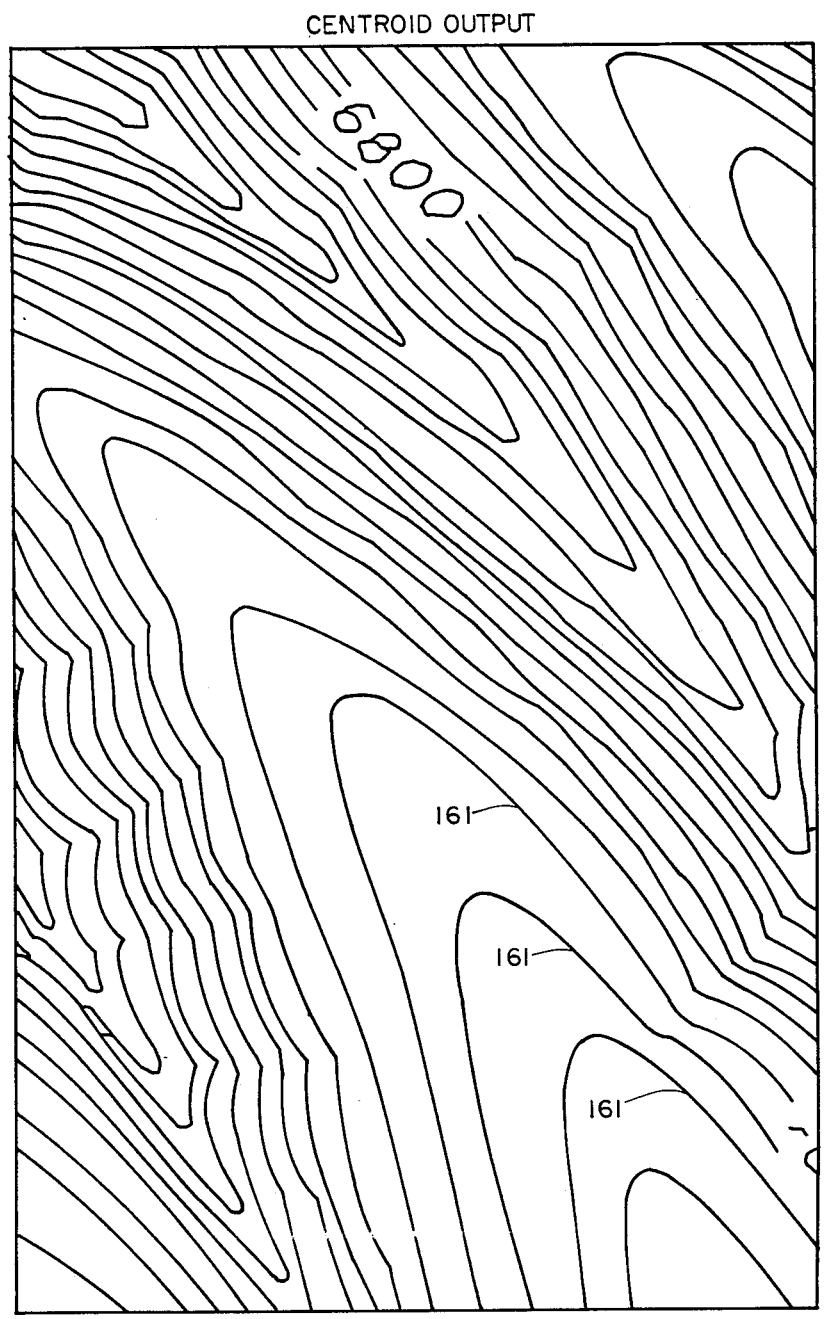
FIG. 16 shows a center line output record of a vectorized image.

After a document has been fully coded the coded data may be used to reproduce a facsimile document, which will be identical, except possibly for runs of up to MAXTRO resolution cells which have been filled or smoothed out. Alternatively an output printer may be activated using the center line parameters (rather than the full two dimensional set of parameters), to print out a pseudocenter image of the document. Such a pseudocenter image includes the center line (or piecewise linear curve) of the graphic element. In FIG. 16 is shown an image of the center lines 161 of a vectorized image such as a shaded topographical map.

Figure 17:
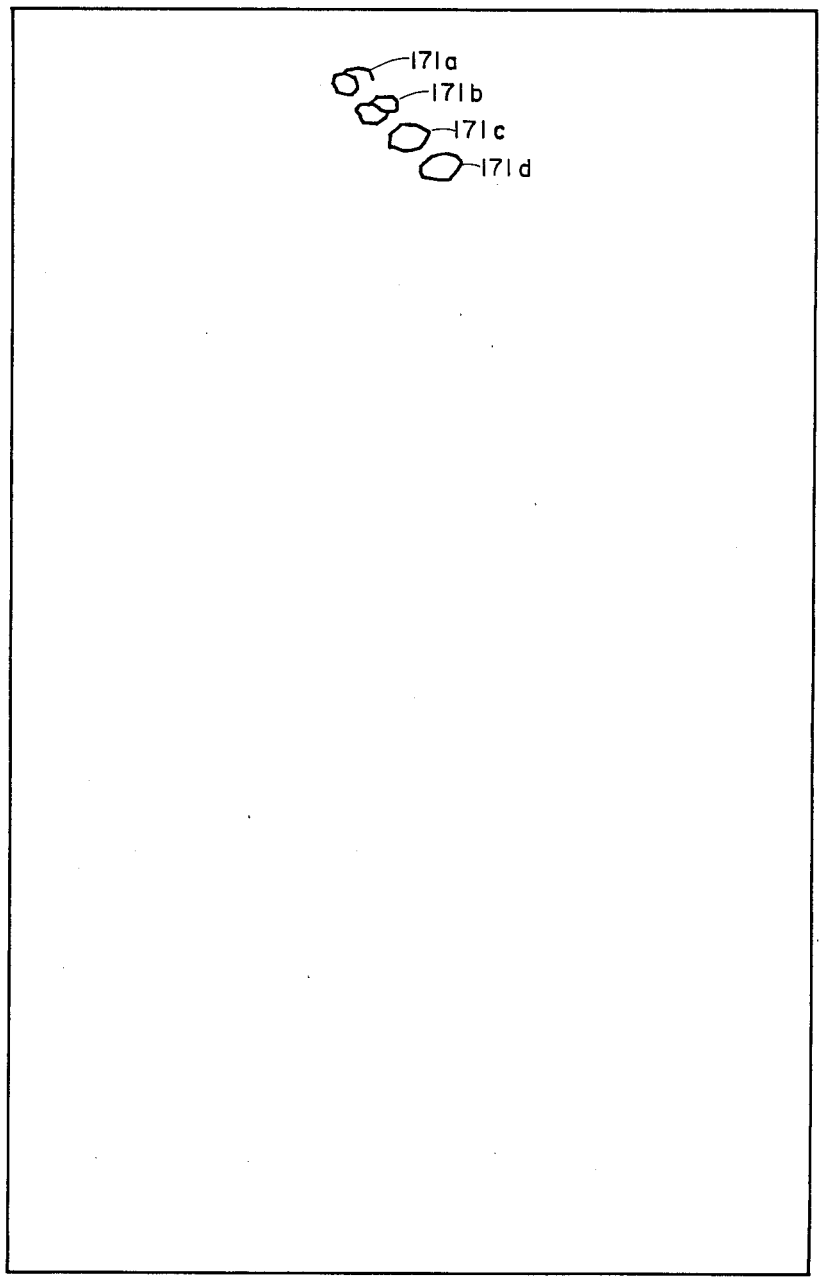
FIG. 17 shows symbol candidates identified from the output record of FIG. 16.

In this form, whether printed or as raw output, it is possible to identify major clusters, which are possible symbols, for subsequent machine analysis. Such clusters may, for instance, be identified in terms of size and connectivity. For example, any isolated graphic element which together with all vectors connected thereto is between 1 cm. and 3 cm. in diameter would be a good candidate for recognition as an alphanumeric symbol. Similar criteria may be established in software to quickly identify small libraries of symbols for a given use—e.g. electronic components in circuit diagram; beam sections and fittings in structural engineering drawings. FIG. 17 shows the symbol candidates 171a–d so extracted from the center line image of FIG. 16.

Once a major cluster or a symbol candidate C has been isolated, the apparatus according to the present invention calculates the center of mass of C from the vectorized representation of C. Specifically a local coordinate system is established and for each trapezoid $T_i$ included in the vector representation of C there are calculated a mass $M_i$ equal to the area of the trapezoid, and coordinates $(X_i, Y_i)$ equal to the center of mass of $T_i$ computed as though $T_i$ were composed of a sheet of material of uniform density. The mass M of symbol C is set equal to $$\sum_i M_i$$

and the center of mass CM is then computed from the first moments of the system of trapezoids around the X- and Y-axes.

Just as in the mathematical description of a physical system in classical mechanics, the first moment around the X axis is defined as $$M_x = \sum_i M_i Y_i$$

and the corresponding first moment around the Y-axis is $$M_y = \sum_i M_i X_i.$$

The center of mass CM of C then has coordinates $$(X, Y) = \left( \frac{M_y}{M}, \frac{M_x}{M} \right).$$

This center of mass point (X, Y), has the property that the sumbol C may be scaled with respect to (X,Y) and the resultant symbol will have the same center of mass (X,Y). Also the area (or mass M) of the symbol C is invariant with respect to rotation of C around the point (X,Y). [This latter property would of course hold for any point (X,Y).] FIGS. 18, 19 show a symbol in two different angular orientations about its center of mass.

Having thus established a fixed point (X,Y) for the candidate C under consideration, the apparatus next determines the point of C which is at a maximum distance from (X,Y). There may be a unique such extremity, as for the symbol "h", several such points, as for the symbol "X", or even a large number of such points, as for a circular "0". Generally, however, there will be a small finite number; in any case the machine simply chooses one extreme point. It will be appreciated that, as a consequence of elementary geometric considerations, the point of extremity of a piecewise linear symbol candidate must be one of the vertices of the candidate, and accordingly for a vectorized image the point of extremity may be ascertained by simply examining the existing output data, computing the distance of each vertex from the center of mass, and taking the maximum one.

At this point it is necessary to distinguish between learning a symbol and recognizing a symbol. The machine "learns" a symbol in a fixed orientation as follows. For a given symbol C of mass M, center of mass CM=(X,Y) and with a principal extremity $(X_e, Y_e)$ the machine stores a vectorized image or optical mask of the symbol rotated and shifted so that the line segment determined by the points (X,Y), $(X_e, Y_e)$ lies in a standard position, along the x-axis with (X,Y) shifted to the origin.

Figure 18:
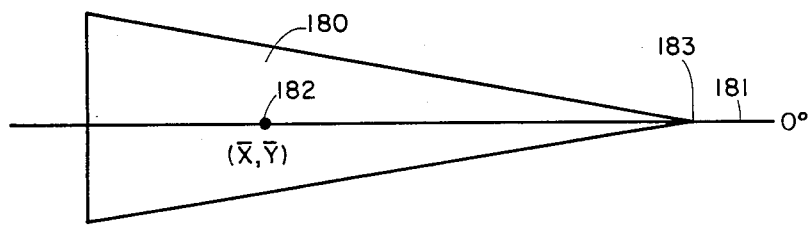
FIG. 18 shows a symbol having center of mass and extremity in the standard orientation.
Figure 19:
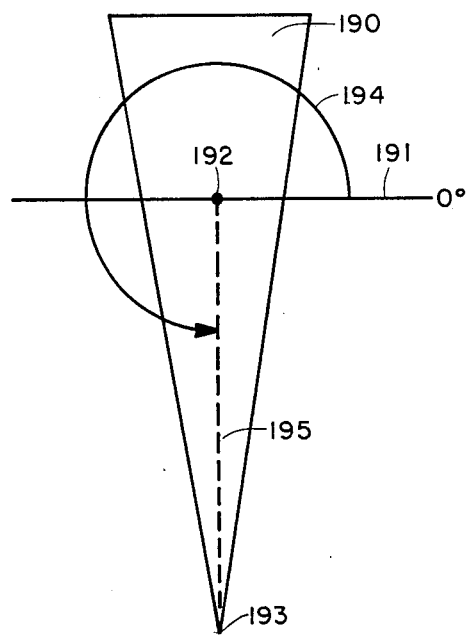
FIG. 19 shows the same image in another orientation.

In FIG. 18 is shown a symbol 180 aligned with its center of mass 182 and its extremity 183 along the X-axis 181. In FIG. 19 is shown a symbol 190 isomorphic to that of FIG. 18 in a different orientation. In FIG. 19 the symbol 190 is shown having center of mass 192 and extremity 193. The center of mass 192 is placed at the origin, and the line segment 195 defined by endpoints 192 and 193 lies at an angle 194 with respect to the X-axis 191.

In a preferred embodiment, for a symbol having multiple extremities, the machine also "learns" the image of the symbol as determined by each of the other extremities. Each of these learned symbols is normalized, e.g. by scaling so that $|E|=1$.

Figure 20:
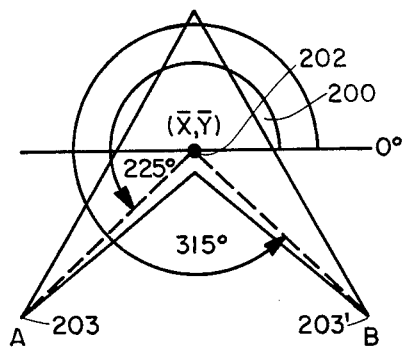
FIGS 20A, 20B and 20C show a symbol having two extremities and illustrates the two library templates against which it would be compared for recognition.
Figure 20:
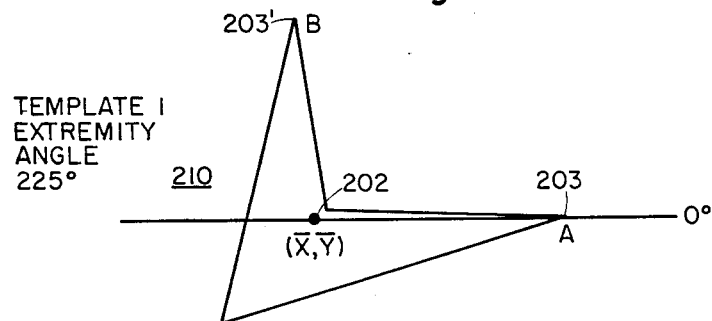
Figure 20:
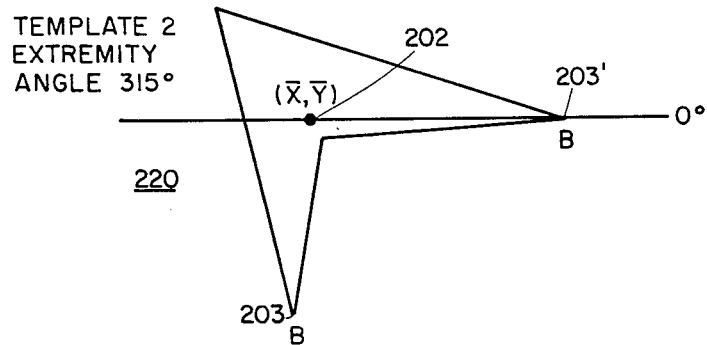

FIGS. 20 A–C show a symbol 200 having center of mass 202 and two extremities 203, 203'. In this situation the stored library of symbols would include two templates 210 and 220 representative of the symbol when it is shifted into the normal position with its centerextremity segment aligned with the x-axis.

Having thus established a library of learned symbols, in order to "recognize" a newly scanned symbol C', the machine takes the symbol candidate, C' and determines its center of mass CM' and extremity E', rotating it degrees into standard position. The candidate C' is then normalized and is compared to the library of learned symbols to determine the degree of overlap. This comparison which in the preferred embodiment is performed numerically (as is the rotation into standard form) amounts to measuring the degree of coincidence of the images of C and C' where C is a learned symbol from the library [Cj] of stored symbol images. This results in a sequence of measures $\{X_j\}$: $(X_j \leq 1)$ of the degree of coincidence between the candidate C' and each learned symbol Cj in the library of stored images. The candidate C' is "recognized" as a particular symbol $C_m$, when $$X_m \geq X_j \quad j \neq m$$

and $X_m$ is sufficiently large, say $X_m > T$, a recognition threshold. The number T may be approximately 0.85–0.9 for recognition of mechanically formed symbols having a definite type font. In this case it has also proven useful to require as a condition of recognition that the number $$\min_{j \neq m} \{X_m - X_j\} \geq k,$$

where k is a small number, e.g. k=0.2, chosen to assure that the coincidence between C' and $C_m$ is significantly better than between C' and each other $C_j$ in the library. In certain instances, as where different symbols are distinguished only by their orientation (such as "p" and "d", or "6" and "9" it may also be necessary in a library containing two such symbols to also store and match the angle 194 as a criterion of the recognition process.

What is claimed is:

1. A method of creating a normalized representation of a symbol candidate appearing in a two-dimensional image field comprising the steps of:
   scanning the candidate in an ordered manner and assigning to the candidate a representation by coordinates along axes of a coordinate system, the coordinates corresponding to the line and position values relating to the scan signals generated by the candidate;
   determining the center of mass of the representation of the candidate;
   determining a point of the candidate at a maximal distance from its center of mass;
   scaling the candidate with respect to its center of mass by a factor proportional to the reciprocal of the distance from the center of mass to the point of maximum extremity;
   rotating the candidate around its center of mass so that the segment determined by its center of mass and the point of maximum extremity lies at a prescribed angular orientation with respect to the axes of the coordinate system;
   comparing the scaled rotated candidate to a library of stored representations of symbols and determining the one with which it has the greatest degree of overlap.

2. A system for identifying, from a cluster of vector data obtained from scanning graphic information along a direction of scan, a symbol in a library of candidates for the symbol, the system comprising:
   means for determining the center of mass of the cluster;
   means for determining a point of the cluster at a maximal distance from its center of mass;
   means for scaling the cluster with respect to the center of mass by a factor proportional to the reciprocal of the distance from the center of mass to the point of maximum extremity, so as to normalize the cluster;
   means for computing a representation of the cluster equivalent to rotating the cluster around the center of mass so that the segment determined by the center of mass and the point of maximum extremity lies at a prescribed angular orientation with respect to the direction of scan; and
   means for comparing the scaled rotated candidate to a library of stored representations of symbols and determining the one with which it has the greatest degree of overlap.

* * * * *